United States Patent Office 3,660,462
Patented May 2, 1972

---

3,660,462
N-ACYL-DICYANOCARBONYL-PHENYL-
HYDRAZONES
Karl Heinz Buchel, Wuppertal-Elberfeld, Ingeborg Hammann, Cologne, Gunter Unterstenhofer, Opladen, and Ferdinand Grewe, Burscheid, Germany, assignors to Farbenfabriken Bayer Aktiengesellschaft, Leverkusen, Germany
No Drawing. Filed Dec. 9, 1969, Ser. No. 883,631
Claims priority, application Germany, Dec. 12, 1968,
P 18 14 252.4
Int. Cl. A01n 9/12, 9/20; C07c 121/78
U.S. Cl. 260—465 D                                        10 Claims

ABSTRACT OF THE DISCLOSURE

N-acyl-dicyanocarbonyl-phenyl-hydrazones, i.e. 1-($\alpha$-cyano-$\alpha$-cyano)-carbonyl-2-(alkyl, chloroalkyl, alkenyl, alkoxy, cycloalkyloxy, alkenyloxy, phenyl, phenoxy and dialkylamino)-carbonyl and thiocarbonyl-2-[(mono, and same and mixed di and tri, -chloro, -fluoro, -trifluoromethyl, -alkyl, -alkoxy, -nitro and -acetylamino)-phenyl]-hydrazones, which possess arthropodicidal, especially acaricidal and insecticidal, as well as fungicidal properties and which may be produced by conventional methods.

---

The present invention relates to and has for its objects the provision for particular new N-acyl-dicyanocarbonyl-phenyl-hydrazones, i.e. 1-($\alpha$-cyano-$\alpha$-cyano)-carbonyl-2-(alkyl, chloroalkyl, alkenyl, alkoxy, cycloalkyloxy, alkenyloxy, phenyl, phenoxy and dialkylamino)-carbonyl and thiocarbonyl-2-[(mono, and same and mixed di and tri, -chloro, -fluoro, -trifluoromethyl, -alkyl, -alkoxy, -nitro and -acetylamino)-phenyl]-hydrazones, which possess arthropodicidal, especially insecticidal and acaricidal, as well as fungicidal properties, active compositions in the form of mixtures of such compounds with solid and liquid dispersible carrier vehicles, and methods for producing such compounds and for using such compounds in a new way especially for combating pests, e.g. arthropods and fungi, with other and further objects becoming apparent from a study of the within specification and accompanying examples.

It is known that certain phenylhydrazones of dicyanoketone, for example $\alpha,\alpha$-dicyano-carbonyl-(2,5-dichloro-phenyl)-hydrazone (A);
$\alpha,\alpha$-dicyano-carbonyl-(3,4,5-trichloro-phenyl)-hydrazone (B);
$\alpha,\alpha$-dicyano-carbonyl-(3,5-bis-trifluoromethyl-phenyl)-hydrazone (C);
$\alpha,\alpha$-dicyano-carbonyl-(2,4,5-trichloro-phenyl)-hydrazone (D);
$\alpha,\alpha$-dicyano-carbonyl-(2-chloro-5-trifluoromethyl-phenyl)-hydrazone (E); and
$\alpha,\alpha$-dicyano-carbonyl-(1,2-dichloro-phenyl)-hydrazone (F), can be used for the control of insects and mites (cf. U.S. Pat. 3,157,569). These known compounds, however, are not known to have any fungicidal properties.

It has now been found, in accordance with the present invention, that the particular new N-acyl-dicyanocarbonyl-phenyl-hydrazones of the formula

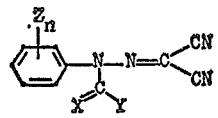

(I)

in which

X is oxygen or sulfur,
Y is alkyl of 1–8 carbon atoms, chloroalkyl of 1–4 carbon atoms, alkenyl of 2–5 carbon atoms, alkoxy of 1–8 carbon atoms, cycloalkyloxy having 5–6 ring carbon atoms, alkenyloxy of 2–6 carbon atoms, phenyl, phenoxy or dialkylamino having 1–4 carbon atoms in each alkyl moiety,
$n$ is a whole integer from 1–3, and
Z, each individually, is chloro, fluoro, trifluoromethyl, alkyl of 1–3 carbon atoms, alkoxy of 1–3 carbon atoms, nitro or acetylamino, exhibit strong arthropodicidal, especially insecticidal and acaricidal, as well as fungicidal properties.

It has been furthermore found, in accordance with the present invention, that the particular new compounds of Formula I above may be produced by a process which comprises (a) reacting an alkali metal salt of a dicyano-carbonyl-phenyl-hydrazone of the formula

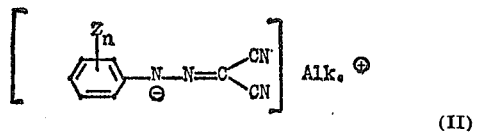

(II)

in which

Z and $n$ are the same as defined above, and
Alk is a sodium or potassium cation, optionally in the presence of a polar solvent, with an acid chloride compound of the formula

(III)

in which X and Y are the same as defined above, or (b) reacting a dicyano-carbonyl-hydrazone of the formula

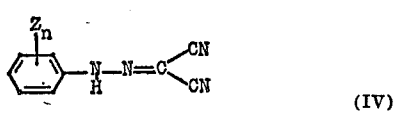

(IV)

in which Z and $n$ are the same as defined above, with an acid chloride compound of Formula III above in a polar solvent in the presence of an acid binding agent.

Advantageously, the particular new compounds of Formula I above are distinguished by outstanding insecticidal, acaricidal and fungicidal properties as well as comparatively low toxicity to warm-blooded animals and concomitantly low phytotoxicity. It is decidedly surprising that the particular new acylated hydrazone according to the present invention exhibit a stronger insecticidal and acaricidal effectiveness than the previously known non-acylated hydrazones of analogous constitution and the same type activity such as compounds (A) to (F) noted above. In addition, the compounds according to the present invention are fungicidally effective and possess a better plant compatibility and a substantially lower toxicity to warm-blooded animals than such known compounds. The particular new compounds according to the present invention therefore represent a valuable contribution to the art.

Advantageously, in accordance with the present invention, in the various formulae herein:

X represents
  oxygen; or
  sulfur;

Y represents
straight and branched chain alkyl hydrocarbon of 1–8 carbon atoms such as methyl, ethyl, n-, and isopropyl, n-, iso-, sec.- and tert.-butyl, n- and iso-amyl, -hexyl, -heptyl and -octyl, 2,2-dimethyl-hexyl, and the like, especially lower alkyl, and more especially $C_{1-4}$ or $C_{1-3}$ or $C_{1-2}$ alkyl;

chloro-substituted straight and branched chain lower alkyl of 1–4 carbon atoms such as chloro-substituted methyl to tert.-butyl inclusive as defined above, and the like, especially chloro-$C_{1-3}$ or $C_{1-2}$ alkyl, and more especially ω-chloro-$C_{1-3}$ or $C_{1-2}$ alkyl;

straight and branched chain lower alkenyl hydrocarbon of 2–5 carbon atoms such as vinyl α-, β- and γ-allyl (i.e. prop-2-enyl, 1-methyl-vinyl and prop-1-enyl), but-1,2 and 3-enyl, 1-methyl-prop-1 and 2-enyl, 2-methyl-prop-1 and 2-enyl, pent-1,2,3 and 4-enyl, and the like, especially $C_{3-4}$ alkenyl, and more especially 2-methyl-prop-2-enyl;

straight and branched chain alkoxy of 1–8 carbon atoms such as methoxy, ethoxy, n- and iso-propoxy, n-, iso-, sec.- and tert.-butoxy, n- and iso-amyloxy, -hexyloxy, -heptyloxy and -octyloxy, 2,2-dimethyl-hexyloxy, and the like, especially lower alkoxy, and more especially $C_{1-4}$ or $C_{1-3}$ or $C_{1-2}$ alkoxy;

cycloalkyloxy having 5–6 ring carbon atoms such as cyclopentyloxy, cyclohexyloxy, and the like, especially cyclohexyloxy;

straight and branched chain alkenyloxy of 2–6 carbon atoms such as vinyloxy, α-, β- and γ-allyloxy (i.e. prop-2-enyloxy, 1-methyl-vinyloxy and prop-1-enyloxy), but-1,2 and 3-enyloxy, 1-methyl-prop-1 and 2-enyloxy, 2-methyl-prop-1 and 2-enyloxy, pent-1,2,3 and 4-enyloxy, hex-1,2,3,4 and 5-enyloxy, 1,2,3 and 4-methyl-pent-1,2,3 and 4-enyloxy, and the like, especially lower alkenyloxy, and more especially $C_{2-5}$ or $C_{2-4}$ or $C_{3-4}$ alkenyloxy;

phenyl;

phenoxy; or dialkylamino having 1–4 carbon atoms in each corresponding alkyl moiety such as di (same or mixed) methyl to tert.-butyl inclusive as defined above, and the like, -amino, especially di-$C_{1-3}$ or $C_{1-2}$ alkyl-amino;

n represents
a whole number from 1 to 3, especially 2–3;

Z, each individually, represents
chloro;
fluoro;
trifluoromethyl;
alkyl of 1–3 carbon atoms such as methyl to isopropyl inclusive as defined above, especially $C_{1-2}$ alkyl;
alkoxy of 1–3 carbon atoms such as methoxy to isopropoxy inclusive as defined above, and the like, especially $C_{1-2}$ alkoxy;
nitro;
acetylamino; or
mixtures thereof;

such that Z on the phenyl ring represents 2-, 3- and 4-mono chloro-, fluoro-, trifluoromethyl-, methyl- to isopropyl-, methoxy- to isopropoxy-, nitro or acetylaminophenyl, 2,3-, 2,4-, 2,5-, 2,6-, 3,4- and 3,5-di (same or mixed) chloro-, fluoro, trifluoromethyl-, methyl- to isopropyl-, methoxy- to isopropoxy-, nitro- and/or acetylaminophenyl, and 2,3,4-, 2,3,5-, 2,3,6-, 2,4,5-, 2,4,6- and 3,4,5-tri (same or mixed) chloro-, fluoro-, trifluoromethyl-, methyl- to isopropyl-, methoxy- to isopropoxy-, nitro- and/or acetylamino- -phenyl, especially 4-fluoro, 3-trifluoromethyl, 3,5 - dichloro, 3,5 - bis-trifluoromethyl, 2- chloro-5-trifluoromethyl, 2,4,5- and 3,4,5-trichloro, and 2-methoxy -4-nitro-5-methyl, -phenyl, and the like.

Preferably, X is oxygen; or sulfur; Y is $C_{1-4}$ alkyl; or chloro-$C_{1-4}$ alkyl; or $C_{3-4}$ alkenyl; or $C_{1-8}$ alkoxy; or $C_{5-6}$ cycloalkyloxy; or $C_{3-6}$ alkenyloxy; or phenyl; or phenoxy; or di-$C_{1-3}$ alkyl-amino; and $Z_n$ is fluoro; or trifluoromethyl- when $n$ is 1; dichloro; or bis-trifluoromethyl; or chlorotrifluoromethyl- when $n$ is 2; and trichloro; or $C_{1-3}$ alkoxy-nitro-$C_{1-3}$ alkyl; or $C_{1-3}$ alkoxy-acetylamino-$C_{1-3}$ alkyl; or $C_{1-3}$ alkoxychloro-$C_{1-3}$ alkyl; or di-$C_{1-3}$ alkoxy-chloro- when $n$ is 3.

In particular, X is oxygen; Y is $C_{1-3}$ alkyl; or chloro-$C_{1-3}$ alkyl; or $C_{3-4}$ alkenyl; or $C_{1-8}$ alkoxy; or cyclohexyloxy; or $C_{3-6}$ alkenyloxy; or phenyl; and $Z_n$ is 4-fluoro; or 3-trifluoro-methyl; or 2-chloro - 5 - trifluoromethyl, or 3,5-dichloro; or 3,5-bis-trifluoromethyl; or 2,4,5- and 3,4,5-trichloro; or 2-methoxy-4-nitro-5-methyl.

Where, for example, the potassium salt of 1-(α,α-di-cyano - carbonyl)-2-(2′,4′,5′-trichloro-phenyl)-hydrazone and propionic acid chloride are used as starting materials, the reaction according to process variant (a) can be represented by the following formula scheme:

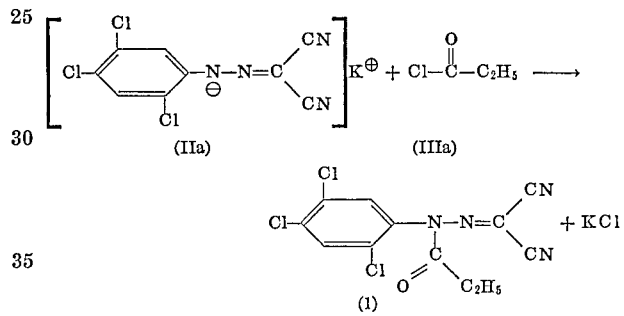

The reaction according to process variant (b) proceeds in analogous manner in the presence of an acid binding agent.

The starting materials which may be used for process variants (a) and (b) are clearly characterized by Formulae II, III and IV noted above.

Many of the phenyl-hydrazones which are usable as starting materials for the instant production process are known. Such known starting materials are clearly characterized by Formula IV above. Their preparation may take place in customary manner (cf. for example Berichte der deutschen chemischen Gesellschaft, 38, 2266 [1905] and J. Chem. Soc. 315 [1944] as well as U.S. Pat. 3,157,569).

The alkali metal salts of the dicyano-carbonylphenyl-hydrazones of Formula II above are new. Such new starting materials can be prepared in simple manner from the appropriate dicyano - carbonyl - phenyl - hydrazones of Formula IV above by stirring one equivalent of such hydrazone of Formula IV with one equivalent of potassium hydroxide or sodium hydroxide at 0–20° C. in water and concentrating the reaction product, and possibly digesting with ether; or by stirring such hydrazone of Formula IV with one equivalent of sodium ethylate in an inert solvent, such as acetonitrile, and then concentrating until crystallization occurs. The salt obtained is expediently dried at a very high temperature. A suitable illustrative example is contained in production Example 7 herein below.

The acid chloride compounds of Formula III above are already known as the artisan will appreciate.

In both process variants (a) and (b), polar inert organic solvents can be used as diluents. These include, in particular, nitriles, such as acetonitrile; ketones, such as acetone; formamides, such as dimethyl formamide; and ethers, such as diethyl ether, tetrahydrofuran and dioxan; and the like.

When carrying out process variant (b), an acid binding agent is used. Particularly suitable for this purpose are tertiary amines, such as triethylamine, dimethylaniline, pyridine, and the like.

The reaction temperatures which may be used in the two process variants are, in general, substantially between about −20 to +60° C., and preferably between about 0 to 50° C.

When carrying out the reaction according to either process variant (a) or (b), the starting materials are generally used in equimolar amounts, or the acid chloride compound may be used in excess. The corresponding molar ratio is normally from 1:1.2 to 1:2. The reaction is, in general, complete after 3–20 hours. The chloride salt formed in the reaction, for example alkali metal chloride or amine hydrochloride, may be filtered off and the active compound of Formula I above may be obtained by concentration of the reaction solution and recrystallization.

Advantageously, the active compounds according to the present invention exhibit strong insecticidal and acaricidal effects, with low phytotoxicity and concomitantly low toxicity to warm-blooded animals. The instant active compounds can therefore be used with markedly good results for the control of noxious sucking and biting insects, Diptera and mites (Acarina). The effect sets in rapidly and is long-lasting.

To the sucking insects contemplated herein there belong, in the main, aphids, such as the green peach aphid (*Myzus persicae*), the bean aphid (*Doralis fabae*); scales, such as *Aspidiotus hederae, Lecanium hesperidum, Pseudococcus maritimus; Thysanoptera,* such as *Hercinothrips femoralis;* and bugs, such as the beet bug (*Piesma quadrata*) and the bed bug (*Cimex lectularius*); and the like.

With the biting insects contemplated herein, there are classed, in the main, butterfly caterpillars, such as *Plutella maculipennis, Lymantria dispar;* bettles, such as granary weevils (*Sitophilus granarius*), the Colorado beetle (*Leptinotarsa decemlineata*), but also species living in the soil, such as the wireworms (Agriotes sp.) and larvae of the cockchafer (*Melolontha melolontha*); cockroaches, such as the German cockroach (*Blattella germanica*); Orthoptera, such as the house cricket (*Gryllus domesticus*); termites, such as Reticulitermes; Hymenoptera, such as ants; and the like.

The Diptera contemplated herein comprise, in particular, the flies, such as the vinegar fly (*Drosophila melanogaster*), the Mediterrean fruit fly (*Ceratitis capitata*), the house fly (*Musca domestica*), and mosquitoes, such as the yellow fever mosquito (*Aedes aegypti*); and the like.

In the case of the mites contemplated herein particularly important are the spider mites (Tetranychidae) such as the two-spotted spider mite (*Tetranychus urticae*), the European red mite (*Paratetranychus pilosus*); gall mites, such as the currant gall mite (*Eriophyes ribis*) and tarsonemids, such as *Tarsonmus pallidus,* and ticks; and the like.

Significantly, the active compounds according to the present invention also exhibit a strong fungitoxic activity against phytopathogenic fungi and can therefore be used for the control of fungal diseases of plants. Fungitoxic agents in plant protection, such as the instant compounds, are used for the control of fungi from the most diverse classes of fungi, such as Archimysetes, Phycomycetes, Ascomycetes, Basidiomycetes and *Fungi Imperfecti*.

In this regard, the active compounds according to the present invention have a very broad spectrum of activity. Such active compounds can be used against parasitic fungi on above-the-soil parts of plants, fungi which cause tracheomycosis which attack the plant from the soil, seed-borne fungi or soil-inhabiting fungi.

The instant active compounds are particularly effective in the case of mildew fungi, for example the Erysiphaceae, such as Erysiphe, Uncinula, Sphaerotheca and Podosphaera, and in the case of non-mildew fungi, such as Venturia species, Peronaspora species and Alternaria species, particularly *Pellicularia sasakii* and *Piricularia oryzae;* and the like.

The instant active compounds are also suitable as seed dressings and soil treatment agents for the control of seed-borne and soil-borne fungal diseases of plants. Typical causative organisms of such diseases are *Tilletia tritici, Ustilago avenae, Fusarium nivale, Verticillium alboatrum, Corticium rolfsii;* and the like.

The active compounds according to the present invention also have a general microbicidal activity, so that they can be used in industrial disinfection, as well.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.) ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, and fungicides, or herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–5%, preferably 0.001–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.001–95%, by weight of the mixture.

In this regard, the concentrations of active compound in the ready-to-use preparations can be varied within fairly wide ranges. In general, the active compound is applied in an amount of substantially between about 0.0001–5%, and preferably between about 0.001–1%, by weight, as aforesaid, for application to plants.

For soil treatment, on the other hand, in general, the active compound is applied suitably in an amount of substantially between about 5–500 g., and preferably between about 10–200 g., per cubic meter of soil.

Furthermore, for seed treatment, in general, the active compound is applied in an amount of substantially between about 50 mg.–5 g., and preferably 100 mg.–2 g., per kg. of seed.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, e.g. arthropods, i.e. insects and acarids, and/or fungi, and more particularly, methods of combating at least one of insects, acarids and fungi which comprise applying to at least one of correspondingly (a) such insects, (b) such acarids, (c) such fungi, and (d) the corresponding habitat thereof, i.e. the locus to be protected, a correspondingly combative or toxic amount, i.e. a pesticidally, e.g. an arthropodicidally, especially insecticidally or acaricidally, or a fungicidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, squirting, pouring, fumigating, dressing, via incrustations, and the like.

It will be realized, of course, that the concentration of the particular active compound utilized alone or in admixture with the carrier vehicle will depend upon the intended application. Therefore, in special cases it is possible to go above or below the aforementioned concentration ranges, amounts per unit volume of soil and amounts per unit weight of seed.

The unexpected superiority and outstanding activity of the particular new compounds of the present invention are illustrated, without limitation, by the following examples:

EXAMPLE 1

Plutella test

Solvent: 3 parts by weight dimethyl formide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dew moist and are then infested with caterpillars of the diamond-back moth (*Plutella maculipennis*).

After the specified period of time, the degree of destruction is determined as a percentage: 100% means that all the caterpillars are killed, whereas 0% means that none of the caterpillars are killed.

The particular active compounds tested, their concentrations, the evaluation time and the results obtained can be seen from the following Table 1.

TABLE 1
[Plant-damaging insects]

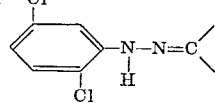

| Active compound No. (see Ex. 7–10) | Concentration of active compound in percent | Degree of destruction in percent after 3 days |
| --- | --- | --- |
| (A) (structure shown; known) | 0.2 | 100 |
|  | 0.02 | 0 |
| (2) | 0.2 | 100 |
|  | 0.02 | 100 |
|  | 0.002 | 25 |
| (1) | 0.2 | 100 |
|  | 0.02 | 100 |
| (3) | 0.2 | 100 |
|  | 0.02 | 70 |
| (4) | 0.2 | 100 |
|  | 0.02 | 100 |
|  | 0.002 | 50 |
| (5) | 0.2 | 100 |
|  | 0.02 | 100 |
| (6) | 0.2 | 100 |
|  | 0.02 | 60 |
| (7) | 0.2 | 100 |
|  | 0.02 | 95 |
| (8) | 0.2 | 100 |
|  | 0.02 | 100 |
| (9) | 0.2 | 100 |
|  | 0.02 | 100 |
|  | 0.002 | 100 |
| (10) | 0.2 | 100 |
|  | 0.02 | 85 |
| (11) | 0.2 | 100 |
|  | 0.02 | 100 |
| (12) | 0.2 | 100 |
|  | 0.02 | 95 |
| (13) | 0.2 | 100 |
|  | 0.02 | 90 |
| (14) | 0.2 | 100 |
|  | 0.02 | 100 |
| (15) | 0.2 | 100 |
|  | 0.02 | 100 |
| (16) | 0.2 | 100 |
|  | 0.02 | 100 |
| (17) | 0.2 | 100 |
|  | 0.02 | 95 |
| (18) | 0.2 | 100 |
|  | 0.02 | 100 |
| (19) | 0.2 | 100 |
|  | 0.02 | 100 |
|  | 0.002 | 80 |
| (20) | 0.2 | 100 |
|  | 0.02 | 90 |
| (21) | 0.2 | 100 |
|  | 0.02 | 90 |
| (22) | 0.2 | 100 |
|  | 0.02 | 100 |
| (23) | 0.2 | 100 |
|  | 0.02 | 90 |
| (24) | 0.2 | 100 |
|  | 0.02 | 95 |
| (25) | 0.2 | 100 |
|  | 0.02 | 80 |
| (26) | 0.2 | 100 |
|  | 0.02 | 100 |
| (27) | 0.2 | 100 |
|  | 0.02 | 100 |

EXAMPLE 2

Phaedon larvae test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dripping wet and then infested with mustard beetle larvae (*Phaedon cochleariae*).

After the specified period of time, the degree of destruction is determined as a percentage: 100% means that all the beetle larvae are killed, whereas 0% means that none of the beetle larvae are killed.

The particular active compounds tested, their concentrations, the evaluation time and the results obtained can be seen from the following Table 2.

TABLE 2
[Plant-damaging insects]

| Active compound No. (see Ex. 7-10) | Concentration of active compound in percent | Degree of destruction in percent after 3 days |
|---|---|---|
| (A) 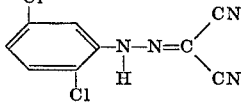 (known) | 0.2 | 100 |
|  | 0.02 | 0 |
| (28) | 0.2 | 100 |
|  | 0.02 | 95 |
| (29) | 0.2 | 100 |
|  | 0.02 | 95 |
| (30) | 0.2 | 100 |
|  | 0.02 | 100 |
|  | 0.002 | 80 |
| (31) | 0.2 | 100 |
|  | 0.02 | 100 |

EXAMPLE 3

Tetranychus test

Solvent: 3 parts by weight dimethyl formamide
Emulsifier: 1 part weight alkyl aryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus urticae*) in all stages of development.

After the specified period of time, the effectiveness of the preparation of the given active compound is determined by counting the dead mites. The degree of destruction thus obtained is expressed as a percentage: 100% means that all the spider mites are killed, whereas 0% means that none of the spider mites are killed.

The particular active compounds tested, their concentrations, the evaluation time and the results obtained can be seen from the following Table 3.

TABLE 3
[Plant-damaging mites]

| Active Compound No. (see Ex. 7-10) | Concentration of active compound in percent | Degree of destruction in percent after 48 hours |
|---|---|---|
| (B) 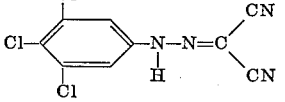 (known) | 0.2 | 40 |
|  | 0.02 | 0 |
| (5) | 0.2 | 100 |
|  | 0.02 | 25 |
| (32) | 0.2 | 100 |
|  | 0.02 | 75 |
| (33) | 0.2 | 100 |
|  | 0.02 | 95 |
| (18) | 0.2 | 100 |
|  | 0.02 | 50 |
| (30) | 0.2 | 100 |
|  | 0.02 | 100 |
|  | 0.002 | 100 |
| (26) | 0.2 | 100 |
|  | 0.02 | 85 |

EXAMPLE 4

Podosphaera test (powdery mildew of apples) [Protective]

Solvent: 4.7 parts by weight acetone
Emulsifier: 0.3 part by weight alkylaryl polyglycol ether
Water: 95 parts by weight The amount of the particular active compound required for the desired final concentration of such active compound in the spray liquid is mixed with the stated amount of solvent, and the resulting concentrate is diluted with the stated amount of water which contains the stated emulsifier.

Young apple seedlings in the 4–6 leaf stage are sprayed with the spray liquid containing the given active compound until dripping wet. The plants remain for 24 hours in a greenhouse kept at 20° C. and at a relative atmospheric humidity of 70%. Such plants are then inoculated by dusting with conidia of the apple powder mildew causative organism (*Podosphaera leucotricha* Salm.) and placed in a greenhouse kept at a temperature of 21–23° C. and at a relative atmospheric humidity of about 70%.

Ten days after inoculation, the infestation of the seedlings is determined as a percentage of the untreated but also inoculated control plants. 0% means no infestation; whereas 100% means that the infestation is exactly as great as in the case of the control plants.

The particular active compounds tested, their concentrations, and the results obtained can be seen from the following Table 4.

TABLE 4
[Podosphaera test (Protective)]

| Active compound No. (see Ex. 7-10) | Infestation as a percentage of the infestation of the untreated control with a concentration of active compound in percent of— | | |
|---|---|---|---|
|  | 0.025 | 0.0062 | 0.00156 |
| (A) 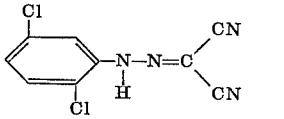 (known) | (1) | (1) | (1) |
| (1) | 0 | 18 |  |
| (34) | 0 | 0 |  |
| (3) | 0 | 0 | 24 |
| (35) | 0 | 0 |  |
| (4) | 0 | 0 | 0 |
| (5) | 0 | 15 |  |
| (6) | 0 | 30 |  |
| (36) | 1 | 10 |  |

See footnote at end of table.

TABLE 4—Continued

| Active compound No. (see Ex. 7-10) | Infestation as a percentage of the infestation of the untreated control with a concentration of active compound in percent of— | | |
|---|---|---|---|
| | 0.025 | 0.0062 | 0.00156 |
| (37) | 5 | | |
| (38) | 0 | | |
| (39) | 0 | | |
| (28) | 0 | | |
| (33) | 1 | | |
| (40) | 0 | | |
| (11) | 0 | | |
| (29) | 0 | | |
| (13) | 0 | 13 | |
| (14) | 0 | 0 | |
| (15) | 0 | 0 | |
| (24) | 0 | 0 | |

[1] Very phytotoxic, therefore evaluation not possible.

EXAMPLE 5

Fusicladium test (apple scab) [Protective]

Solvent: 4.7 parts by weight acetone
Emulsifier: 0.3 part by weight alkylaryl polyglycol ether
Water: 95 parts by weight The amount of the particular active compound required for the desired final concentration of such active compound in the spray liquid is mixed with the stated amount of solvent, and the resulting concentrate is diluted with the stated amount of water which contains the stated emulsifier.

Young apple seedlings in the 4–6 leaf stage are sprayed with the spray liquid of the given active compound until dripping wet. The plants remain for 24 hours in a greenhouse kept at 20° C. and at a relative atmospheric humidity of 70%. Such plants are then inoculated with an aqueous conidium suspension of the apple scab causative organism (*Fusicladium dendriticum* Fück.) and incubated for 18 hours in a humidity chamber kept at 18–20° C. and at a relative atmospheric humidity of 100%.

The plants are then again placed in a greenhouse for 14 days.

15 days after inoculation, the infestation of the seedlings is determined as a percentage of the untreated but also inoculated control plants. 0% means no infecation; whereas 100% means that the infestation is exactly as great as in the case of the control plants.

The particular active compounds tested, their concentrations, and the results obtained can be seen from the following Table 5.

TABLE 5

[Fusicladium test (Protective)]

| Active compound No. (see Ex. 7 to 10) | Infestation as a percentage of the infestation of the untreated control with a concentration of active compound in percent of— | | |
|---|---|---|---|
| | 0.025 | 0.0062 | 0.00156 |
| (A) Cl–[ring]–N–N=C(CN)(CN), H, Cl (known) | [1] | [1] | [1] |
| (4) | 0 | 0 | 0 |
| (5) | 0 | 0 | 3 |
| (32) | 0 | 0 | 15 |
| (6) | 0 | 0 | 13 |
| (41) | 0 | 9 | |
| (7) | 0 | 2 | |
| (28) | 5 | | |
| (33) | 16 | | |
| (40) | 9 | | |
| (11) | 14 | | |

[1] Very phytotoxic, therefore evaluation not possible.

EXAMPLE 6

From a consideration of the following two tables, it can be seen that the acylated hydrazone compounds according to the present invention, in comparison with typical corresponding non-acylated hydrazone compounds of the previously known group of dicyano-carbonyl-phenyl-hydrazones, are substantially less toxic to warm-blooded animals.

TABLE 6

$LD_{50}$ values (mg./kg. mouse, per os) of some non-acylated dicyano-carbonyl-phenyl-hydrazones:

| | | $LD_{50}$ (mg./kg.) |
|---|---|---|
| (C) | F₃C–[ring(F₃C)]–N(H)–N=C(CN)(CN) | 25–40 |
| (D) | Cl–[ring(Cl,Cl)]–N(H)–N=C(CN)(CN) | 50–100 |
| (E) | F₃C–[ring(Cl)]–N(H)–N=C(CN)(CN) | 50–100 |

TABLE 7

$LD_{50}$ values (mg./kg. mouse, per os) of some of the acylated compounds according to the present invention. The compounds correspond to Formula I, with respect to the appropriate symbol variables (cf. Examples 7–10):

| | Z | X | Y | $LD_{50}$ (mg./kg.) |
|---|---|---|---|---|
| (3) | 2,4,5-Cl₃ | O | —O—CH₂CH(CH₃)₂ | >1,000 |
| (4) | 2,4,5-Cl₃ | O | OC₂H₅ | >1,000 |
| (35) | 2-Cl, 5-CF₃ | O | —O—CH₂CH(CH₃)₂ | >2,000 |
| (5) | 2-Cl, 5-CF₃ | O | OC₂H₅ | >500 |
| (8) | 3,5-Cl₂ | O | OC₂H₅ | >1,000 |
| (19) | 3,5-(CF₃)₂ | O | —C₃H₇ | >500 |
| (9) | 3,5-(CF₃)₂ | O | —OCH₃ | 500–1,000 |

The following further examples illustrate, without limitation, the manner of producing the particular active compounds according to the present invention.

EXAMPLE 7

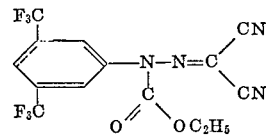

(2)

(a) 34.4 g. (0.1 mol) of dry potassium salt of 1-(α,α-dicyano-carbonyl)-2-(3′,5′-bis-trifluoromethyl - phenyl)-hydrazone are suspended in 200 ml. of absolute acetonitrile, and 21.6 g. (0.2 mol) of chloroformic acid ethyl ester are added dropwise, with stirring. The suspension is then heated to 50° C. for 4 hours. The reaction mixture is concentrated in a vacuum and the residue is recrystallized from 2 litres of ligroin. 28.4 g. (75% of the theory) of N-carboethoxy-(α,α-dicyano-carbonyl)-N-(3,5-bis - trifluoromethyl-phenyl)-hydrazone, i.e. 1-(α,α-dicyano-carbonyl)-2-carboethoxy - 2 - (3′,5′ - bis - trifluoromethyl-phenyl)-hydrazone, are obtained as colorless crystals of melting point 135° C.

(b) The potassium salt used as starting material can be prepared as follows:

One mol of the corresponding phenyl-hydrazone is suspended in methanol, one mol of methanolic KOH is added and the mixture is stirred for several hours. The methanol is then largely distilled off in a vacuum, ether is added to the residue, and the formed potassium salt is filtered off with suction and dried at 60–90° C. in a vacuum.

EXAMPLE 8

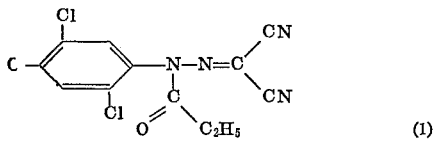

(1)

31.1 g. (0.1 mol) of dry potassium salt of 1-($\alpha,\alpha$-dicyano-carbonyl)-2-(2′,4′,5′-trichloro-phenyl) - hydrazone are suspended in 200 ml. of dry acetonitrile, and a solution of 10.5 g. (0.12 mol) of propionyl chloride in 50 ml. of acetonitrile is added dropwise at room temperature, with stirring. The mixture is stirred for 3 hours at room temperature and then heated for 5 hours to 50° C. The solvent is distilled off in a vacuum, and the residue is taken up with ether; filtration is effected and concentration is again carried out. From ligroin, 21 g. (65%) of N-propionyl-($\alpha,\alpha$-dicyano-carbonyl) - N - (2,4,5 - trichloro-phenyl)-hydrazone, i.e. 1-($\alpha,\alpha$-dicyano-carbonyl)-2 - propionyl-2-(2′,4′,5′-trichloro-phenyl) - hydrazone, are obtained as colorless crystals of melting point 124° C.

EXAMPLE 9

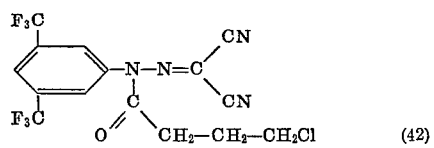

(42)

34.4 g. (0.1 mol) of dry potassium salt of 1-($\alpha,\alpha$-dicyano-carbonyl)-2-(3′,5′-bis-trifluoromethyl-phenyl) - hydrazone are suspended in 200 ml. of absolute acetonitrile, and a solution of 16 g. (0.12 mol) of 4-chloro-butyric acid chloride in 50 ml. of acetonitrile is added dropwise at 0° C., with stirring. Stirring is effected for one hour at 0° C., then for 10 hours at room temperature. The reaction mixture is subsequently filtered and the filtrate is concentrated in a vacuum. The above residue is clarified in 500 ml. of boiling ligroin with activated charcoal, and recrystallized. 22 g. (54%) of N-(4-chloro-butyryl)-($\alpha,\alpha$-dicyano-carbonyl)-N-(3,5-bis-trifluoromethyl-phenyl) - hydrazone, i.e. 1-($\alpha,\alpha$-dicyano-carbonyl) - 2 - (4′ - chloro-butyryl)-2-(3″,5″-bis-trifluoromethyl-phenyl)-hydrazone, of melting point 124–125° C. are obtained.

EXAMPLE 10

In manner analogous with that described in Examples 7–9, the following compounds according to Formula I above, in which $Z_n$, X and Y are as noted, can be prepared:

| Compound | $Z_n$ | X | Y | M.P., °C. |
|---|---|---|---|---|
| (34) | 3,5-(CF$_3$)$_2$ | O | —OCH$_2$CH(CH$_3$)$_2$ | 114 |
| (3) | 2,4,5-Cl$_3$ | O | —OCH$_2$CH(CH$_3$)$_2$ | 108 |
| (35) | 2-Cl,5-CF$_3$ | O | —OCH$_2$CH(CH$_3$)$_2$ | 110 |
| (4) | 2,4,5-Cl$_3$ | O | —OC$_2$H$_5$ | 161 |
| (5) | 2-Cl,5-CF$_3$ | O | —OC$_2$H$_5$ | 117 |
| (43) | 2-OCH$_3$, 4-NO$_2$, 5-CH$_3$ | O | —OC$_2$H$_5$ | 113 |
| (32) | 4-F | O | —OC$_2$H$_5$ | 82 |
| (44) | 3,5-(CF$_3$)$_2$ | S | —N(CH$_3$)$_2$ | 138 |
| (6) | 4-F | O | —OCH$_2$CH(CH$_3$)$_2$ | 80 |
| (41) | 2-OCH$_3$, 4-NO$_2$, 5-CH$_3$ | O | —OCH$_2$CH(CH$_3$)$_2$ | 109 |
| (45) | 2-OCH$_3$, 4-NH—C(=O)—CH$_3$, 5-CH$_3$ | O | —OCH$_2$CH(CH$_3$)$_2$ | 204 |
| (46) | 2,5-(OCH$_3$)$_2$, 4-Cl | O | —OC$_2$H$_5$ | 164 |
| (47) | 2-OCH$_3$, 4-Cl, 5-CH$_3$ | O | —OC$_2$H$_5$ | 159 |
| (7) | 3,5-Cl$_2$ | O | —OCH$_3$ | 222 |
| (8) | 3,5-Cl$_2$ | O | —OC$_2$H$_5$ | 184 |
| (9) | 3,5-(CF$_3$)$_2$ | O | —OCH$_3$ | 182 |
| (48) | 3,5-(CF$_3$)$_2$ | O | —O—C$_6$H$_5$ | 209 |
| (36) | 3,5-(CF$_3$)$_2$ | O | —OC$_5$H$_{11}$-n | 120 |
| (10) | 3,5-(CF$_3$)$_2$ | O | —OC$_6$H$_{13}$-n | 118 |
| (49) | 3,5-(CF$_3$)$_2$ | O | —OCH$_2$—C(CH$_3$)$_2$—(CH$_2$)$_3$CH$_3$ | 127 |
| (50) | 3,5-(CF$_3$)$_2$ | O | —C$_8$H$_{17}$-n | 91 |
| (37) | 3,5-Cl$_2$ | O | —O—C$_6$H$_4$—H | 98–102 |
| (38) | 2,4,5-Cl$_3$ | O | —O—C$_6$H$_4$—H | 105 |
| (39) | 2,4,5-Cl$_3$ | O | —O—C$_6$H$_{13}$-n | 68–70 |
| (51) | 3,5-(CF$_3$)$_2$ | O | —O—C$_6$H$_4$—H | 176 |
| (28) | 2,4,5-Cl$_3$ | O | —OC$_5$H$_{11}$-n | 87 |
| (52) | 2,4,5-Cl$_3$ | O | —OCH$_2$—C(CH$_3$)$_2$—(CH$_2$)$_3$CH$_3$ | 105 |
| (33) | 2,4,5-Cl$_3$ | O | —OC$_8$H$_{17}$-n | 60 |
| (40) | 3,4,5-Cl$_3$ | O | —OCH$_2$CH(CH$_3$)$_2$ | 103 |
| (11) | 3,4,5-Cl$_3$ | O | —OC$_2$H$_5$ | 157 |
| (29) | 2,4,5-Cl$_3$ | O | —OCH$_3$ | 172 |
| (12) | 3,4,5-Cl$_3$ | O | —OCH$_3$ | 170 |
| (13) | 2,4,5-Cl$_3$ | O | —OC$_3$H$_7$-n | 131 |
| (14) | 2,4,5-Cl$_3$ | O | —OCH(CH$_3$)$_2$ | 108 |
| (15) | 3,4,5-Cl$_3$ | O | —OC$_3$H$_7$-n | 120 |

TABLE—Continued

| Compound | Zₙ | X | Y | M.P., °C. |
|---|---|---|---|---|
| (16) | 3-CF₃ | O | —OC₂H₅ | 118 |
| (17) | 3,4,5-Cl₃ | O | —OC₄H₉-n | 124 |
| (18) | 2-Cl, 5-CF₃ | O | —C₂H₅ | 95 |
| (19) | 3,5-(CF₃)₂ | O | —C₃H₇-n | 134 |
| (20) | 3,5-(CF₃)₂ | O | —C₂H₅ | 166 |
| (21) | 3,5-(CF₃)₂ | O |  | 175 |
| (22) | 3,5-(CF₃)₂ | O | —CH=C(CH₃)₂ | 167 |
| (30) | 2,4,5-Cl₃ | O | —CH₃ | 151 |
| (23) | 2,4,5-Cl₃ | O |  | 166 |
| (31) | 3,5-CF₃ | O | —CH₃ | 168 |
| (24) | 3,4,5-Cl₃ | O | —C₂H₅ | 126 |
| (53) | 3,4,5-Cl₃ | O | —CH₃ | 189 |
| (25) | 3-CF₃ | O | —CH₃ | 156 |
| (26) | 3,5-(CF₃)₂ | O | —CH₂CH₂Cl | 172 |
| (27) | 3-CF₃ | O | —C₂H₅ | 139 |

The following typical compounds are particularly preferred:

(1) 1-(α,α-dicyano-carbonyl)-2-propionyl-2-(2',4',5'-trichloro-phenyl)-hydrazone
(2) 1-(α,α-dicyano-carbonyl)-2-carboethoxy-2-(3',5'-bis-trifluoromethyl-phenyl)-hydrazone
(21) 1-(α,α-dicyano-carbonyl)-2-benzoyl-2-(3',5'-bis-trifluoromethyl-phenyl)-hydrazone
(22) 1-(α,α-dicyano-carbonyl)-2-(3'-methyl-but-2'-enoyl)-2-(3'',5''-bis-trifluoromethyl-phenyl)-hydrazone
(26) 1-(α,α-dycyano-carbonyl)-2-(3'-chloro-propionyl)-2-(3'',5''-bis-trifluoromethyl-phenyl)-hydrazone
(38) 1-(α,α-dicyano-carbonyl)-2-carbo-cyclohexyloxy-2-(2',4',5'-trichloro-phenyl)-hydrazone
(41) 1-(α,α-dicyano-carbonyl)-2-carbo-isobutoxy-2-(2'-methoxy-4'-nitro-5'-methyl-phenyl)hydrazone It will be realized that all of the foregoing compounds contemplated by the present invention possess the desired strong and selective pesticidal, especially arthropodicidal, i.e. insecticidal or acaricidal, as well as fungicidal, properties, with regard to a broad spectrum of activity, for combating insects and acarids, as well as fungi, and that such compounds have a comparatively low toxicity toward warm-blooded creatures and a concomitantly low phytotoxicity, enabling such compounds to be used with correspondingly favorable compatibility with respect to warm-blooded creatures and plants for more effective control and/or elimination of insects, acarids and fungi by application of such compounds to such insects, acarids, fungi and/or the corresponding habitat thereof.

As may be used herein, the terms "arthropod" "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. N-acyl-dicyano-carbonyl-phenyl-hydrazone of the formula

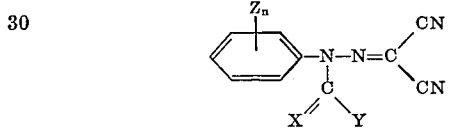

in which X is selected from the group consisting of oxygen and sulfur, Y is selected from the group consisting of alkyl of 1–8 carbon atoms, chloroalkyl of 1–4 carbon atoms, alkenyl of 2–5 carbon atoms, alkoxy of 1–8 carbon atoms, cycloalkyloxy having 5–6 ring carbon atoms, alkenyloxy of 2–6 carbon atoms, phenyl, phenoxy and dialkylamino having 1–4 carbon atoms in each alkyl moiety, n is a whole number from 1 to 3, and Z, each individually, is selected from the group consisting of chloro, fluoro, trifluoromethyl, alkyl of 1–3 carbon atoms, alkoxy of 1–3 carbon atoms, nitro and acetylamino.

2. Compound according to claim 1 wherein X is selected from the group consisting of oxygen and sulfur, Y is selected from the group consisting of $C_{1-4}$ alkyl, chloro-$C_{1-4}$ alkyl, $C_{3-4}$ alkenyl, $C_{1-8}$ alkoxy, $C_{5-6}$ cycloalkyloxy, $C_{3-6}$ alkenyloxy, phenyl, phenoxy and di-$C_{1-3}$ alkyl-amino, and $Z_n$ is selected from the group consisting of fluoro, trifluoromethyl, dichloro, bis-trifluoromethyl, chloro-trifluoromethyl, trichloro, $C_{1-3}$ alkoxy-nitro-$C_{1-3}$ alkyl, $C_{1-3}$ alkoxy-acetylamino-$C_{1-3}$ alkyl, $C_{1-3}$ alkoxy-chloro-$C_{1-3}$ alkyl and di-$C_{1-3}$ alkoxy-chloro.

3. Compound according to claim 1 wherein X is oxygen, Y is $C_{1-3}$ alkyl, chloro-$C_{1-3}$ alkyl, $C_{3-4}$ alkenyl, $C_{1-8}$ alkoxy, cyclohexyloxy, $C_{3-6}$ alkenyloxy and phenyl, and $Z_n$ is selected from the group consisting of 4-fluoro, 3-trifluoromethyl, 3,5-dichloro, 3,5-bis-trifluoromethyl, 2-chloro-5-trifluoromethyl, 2,4,5- and 3,4,5-trichloro and 2-methoxy-4-nitro-5-methyl.

4. Compound according to claim 1 wherein such compound is 1-(α,α-dicyano-carbonyl)-2-propionyl-2-(2',4',5'-trichlorophenyl)-hydrazone of the formula

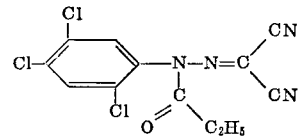

5. Compound according to claim 1 wherein such compound is 1 - (α,α - dicyano-carbonyl)-2-carboethoxy-2-

(3',5'-bis-trifluoromethyl-phenyl)-hydrazone of the formula

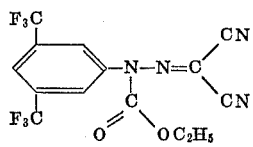

6. Compound according to claim 1 wherein such compound is 1 - (α,α-dicyano-carbonyl)-2-benzoyl-2-(3',5'-bis-trifluoromethyl-phenyl)-hydrazone of the formula

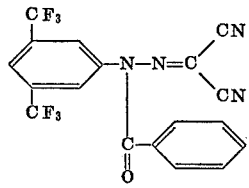

7. Compound according to claim 1 wherein such compound is 1 - (α,α-dicyano-carbonyl)-2-(3'-methyl-but-2'-enoyl)-2-(3'',5''-bis-trifluoromethyl-phenyl)-hydrazone of the formula

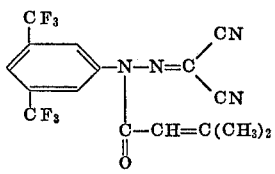

8. Compound according to claim 1 wherein such compound is 1 - (α,α - dicyano-carbonyl)-2-(3'-chloro-propionyl)-2-(3'',5'' - bis-trifluoromethyl-phenyl)-hydrazone of the formula

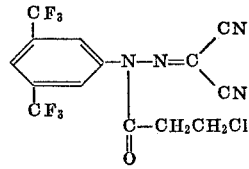

9. Compound according to claim 1 wherein such compound is 1 - (α,α-dicyano-carbonyl)-2-carbo-cyclohexyl-oxy-2-(2',4',5'-trichloro-phenyl)-hydrazone of the formula

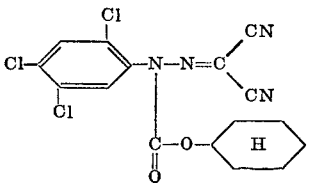

10. Compound according to claim 1 wherein such compound is 1-(α,α-dicyano-carbonyl)-2-carbo-isobutoxy-2-(2'-methoxy-4'-nitro-5'-methyl-phenyl)hydrazone of the formula

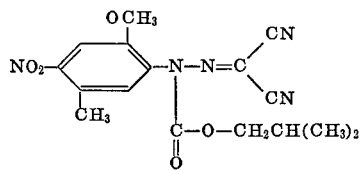

References Cited

UNITED STATES PATENTS

| | | | |
|---|---|---|---|
| 2,658,889 | 11/1953 | Goldberg et al. | 260—465 X |
| 3,157,569 | 11/1964 | Addor et al. | 260—465 X |
| 3,179,651 | 4/1965 | Stacey | 260—465 X |
| 3,202,698 | 8/1965 | Prichard | 260—465 |

JOSEPH REBOLD, Primary Examiner

D. H. TORRENCE, Assistant Examiner

U.S. Cl. X.R.

260—465 E; 424—304